United States Patent [19]

Roy

[11] Patent Number: 6,046,763
[45] Date of Patent: Apr. 4, 2000

[54] MAXIMUM FLOW METHOD FOR STEREO CORRESPONDENCE

[75] Inventor: Sebastien Roy, Pennington, N.J.

[73] Assignee: NEC Research Institute, Inc., Princeton, N.J.

[21] Appl. No.: 08/978,834

[22] Filed: Nov. 26, 1997

Related U.S. Application Data

[60] Provisional application No. 60/043,665, Apr. 11, 1997.
[51] Int. Cl.$^7$ .................................................. H04N 13/02
[52] U.S. Cl. ............................................. 348/47; 382/154
[58] Field of Search .................................. 348/42, 46, 47; 382/154; H04N 13/02

[56] References Cited

U.S. PATENT DOCUMENTS

| | | | |
|---|---|---|---|
| 5,383,013 | 1/1995 | Cox | 356/2 |
| 5,917,937 | 6/1999 | Szeliski | 382/154 |
| 5,973,754 | 10/1999 | Panis | 348/699 |

OTHER PUBLICATIONS

Ohta et al., "Stereo by Intra and Inter–Scanline Using Dynamic Programming", IEEE Trans. Pattern Analysis and Machine Intelligence, 7(2):139, 1996.

Cox et al., "A Maximum Likelihood Stereo Algorithm", Computer Vision and Image Understanding, 63(3):542–567, 1996.

Belhumeur, "A Bayesian Approach to Binocular Stereopsis", Int. J. Computer Vision, 19(3):237–260, 1996.

*Primary Examiner*—Howard Britton
*Attorney, Agent, or Firm*—Philip J. Feig

[57] ABSTRACT

A method for solving the stereo correspondence problem transforms the problem into a maximum-flow problem. Once solved, the minimum-cut associated to the maximum-flow results in a disparity surface for the entire image at once. This global approach to stereo analysis provides a more accurate and coherent depth map than the traditional line-by-line stereo method. Moreover, the optimality of the depth surface is guaranteed and can be shown to be a generalization of the dynamic programming approach that is widely used in standard stereo. Results show improved depth estimation as well as better handling of depth discontinuities. While the worst case running time is $O(n^3 d^3)$, the observed average running time is $O(n\ d^{1.4})$ for an image size of n pixels and depth resolution d.

8 Claims, 10 Drawing Sheets

RIGHT

LEFT

FIG. 9D cost = c          cost = c/10+1        cost = 1

MAXIMUM FLOW METHOD FOR STEREO CORRESPONDENCE

This Application claims benefit of Provisional Application Ser. No. 60/043,665 field Apr. 11, 1997.

FIELD OF THE INVENTION

The present invention relates generally to the field of machine vision and in particular to a method for providing stereo correspondence between two or more arbitrary views of a scene.

BACKGROUND OF THE INVENTION

It is well known in the art that depth related displacements in stereo pairs always occur along lines, the epipolar lines. Traditionally, this constraint has been most widely used to decompose a matching process into a number of independent matching of pairs of lines. However, the solutions obtained on consecutive epipolar lines can vary significantly and create artifacts across epipolar lines that affect in particular object boundaries that are perpendicular to the epipolar lines (i.e. a vertical boundary with horizontal epipolar lines). Consequently, several attempts have been made to relate the solutions of consecutive lines.

In an article by Y. Ohta and T. Kanade, entitled "Stereo by intra and inter-scanline using dynamic programming", IEEE Trans. Pattern Analysis and Machine Intelligence, 7(2):139, 1996, dynamic programming is used to first match epipolar lines and then iteratively improve the solutions obtained by using vertical edges as reference. In an article by I. J. Cox, S. Hingorani, B. M. Maggs and S. B. Rao, entitled "A maximum likelihood stereo algorithm", Computer Vision and Image Understanding, 63(3):542–567, 1996, a probabilistic approach is used to relate the individual matchings obtained by dynamic programming to improve the depth map quality. Finally, in an article by P. N. Belhumeur, entitled "A bayesian approach to binocular stereopsis", Int. J. Computer vision, 19(3):237–260, 1996, a Bayesian approach is described. Unfortunately, the optimality and simplicity of dynamic programming applied to a single pair of epipolar lines cannot be generalized directly to the matching of all epipolar lines at once. For such a case, only iterative or approximate solutions are available. One such iterative or approximate solution is described in Ohta et al, supra.

The dynamic programming approach for finding a matching path between two lines cannot be generalized to matching two full images at once. However, I have discovered that a formulation using maximum-flow estimation can be used instead which allows matching full images without concern for epipolar lines.

SUMMARY OF THE INVENTION

The above problems are solved and an advance is made over the prior art in accordance to the teachings of the present invention in which a new method is used to perform stereoscopic correspondence between two or more arbitrary views of a scene. The method advantageously solves the stereo correspondence problem which is formulated as a maximum flow in a graph, thereby alleviating many of the problems associated with standard line-by-line stereo methods.

Stereo matching of images is a process of matching points in the different images of the same scene in order to determine the depth of the points, so-called depth map or disparity map, as the output of the stereo matching process. Previous stereo matching processes were limited to arrangements where the cameras recording the image had to be on the same line, i.e. share a common baseline. In addition, prior stereo correspondence was performed on a line-by-line basis using epipolar lines.

The present invention matches points from two or more images when the images are arbitrary views. That is, the positions of the cameras recording the image are not collinear.

A primary advantage of the invention is the ability to match the entire image at one time rather than matching in a line-to-line manner.

The invention relies upon a maximum flow-minimum cut method to perform the stereoscopic correspondence between two or more arbitrary views of a scene. The result is a more efficient, faster and higher quality solution to the stereo correspondence problem.

The invention will be more clearly understood when the following description is read in conjunction with the accompanying drawing.

DETAILED DESCRIPTION

The standard stereo geometry is composed of two cameras viewing the same scene from different viewpoints. The geometry equations can be derived describing arbitrary multi-image stereo geometry. In the simple case of two cameras separated horizontally by a baseline distance b, the set of corresponding images point $v(x'_0, y'_0, d)$ associated with image point $(x'_0, y'_0)$ at disparity d is $$v(x'_0, y'_0, d) = \{I_1(x'_0, y'_0), I_2(x'_0 + bd, y'_0),\} \quad (1)$$

as derived from Equation 3 below. The usual matching cost function derived from $v(x'_0, y'_0, d)$ is the sum of square difference of pixel intensities $$cost(x'_0, y'_0, d) = (I_1(x'_0, y'_0) - I_2(x'_0 + bd, y'_0))^2 \quad (2)$$

Even though the remainder of the discussion uses this stereo framework for simplicity, the invention generalizes directly to consider stereo in the context of multiple images taken under arbitrary camera geometries (i.e. multiple baselines). This naturally extends the traditional two-images, single-baseline framework for stereo.

Figure 11:
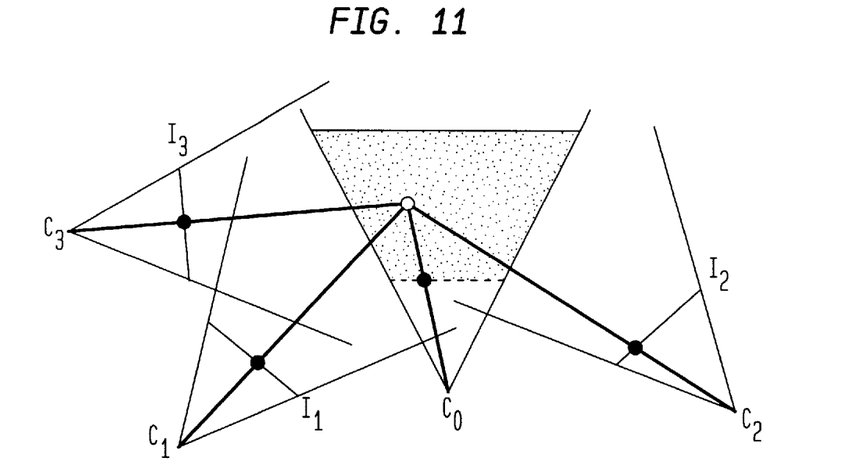
FIG. 11 is a schematic diagram showing the general stereo framework for a situation having three cameras.
Figure 12A:
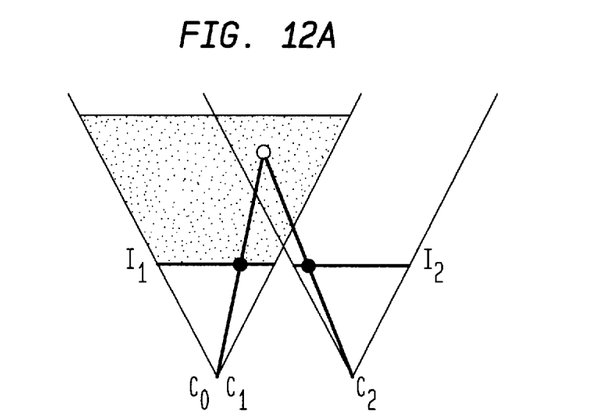
FIGS. 12A and 12B are a schematic diagram showing a horizontal binocular stereo framework having two cameras.
Figure 12B:
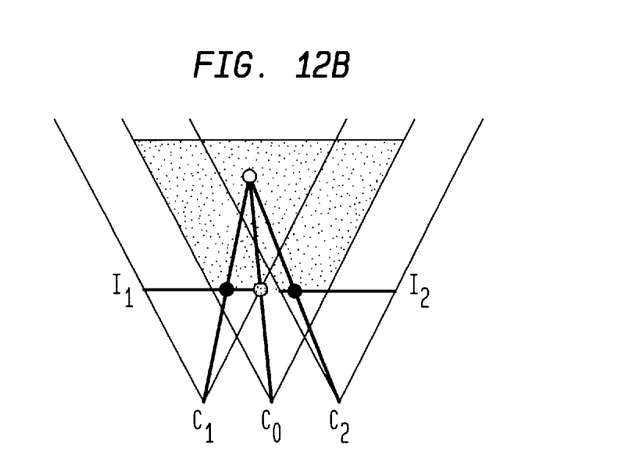

The general framework of the invention is illustrated in FIG. 11. Three cameras $C_1$, $C_2$ and $C_3$ provide the images $I_1$, $I_2$, and $I_3$ for corresponding matching. The reference camera $C_0$ is the view for which it is desired to compute the disparity map (or equivalently depth map) for every image point. The reference camera may have no associated image. It will rather be reconstructed after stereo matching. As illustrated in FIGS. 12A and 12B, the standard horizontal binocular stereo setup is easily expressed in this general framework. In that case, the reference view $C_0$ coincides exactly with the first camera $C_1$ (FIG. 12A). Placing the reference view equidistant between camera $C_1$ and camera $C_2$ gives rise to the cyclopean stereo setup (FIG. 12B).

A set of n camera $C_1, \ldots, C_n$ provides n images $I_1, \ldots, I_n$. A point $P_w$ expressed in the world coordinate system with homogeneous coordinates $$P_w = [X_w \ Y_w \ Z_w \ 1]^T$$

can be transformed to the homogeneous point $P_i$ in the coordinate system of camera i by the relation $$P_i W_i P_w$$

where $$W_i = \begin{bmatrix} R_i & T_i \\ 0^T & 1 \end{bmatrix}$$

and $R_i$ is a rotation matrix, $T_i$ is a translation vector and $0_T$ is a null vector. Assuming a pinhole camera model, a point $P_i$ is projected onto the image plane in the projective point $p_i$ by the relation $$p_i = \begin{bmatrix} x_i \\ y_i \\ z_i \end{bmatrix} = J P_i$$

where J is the projection matrix defined as $$J = \begin{bmatrix} 1 & 0 & 0 & 0 \\ 0 & 1 & 0 & 0 \\ 0 & 0 & 1 & 0 \end{bmatrix}$$

From a transformed and projected point pi, the corresponding image coordinates $p'_i$ are obtained as $$p'_i = H(p_i)$$

where H is an homogenizing function $$H\left(\begin{bmatrix} x \\ y \\ h \end{bmatrix}\right) + \begin{bmatrix} x/h \\ y/h \end{bmatrix}$$

During the process of stereo matching, each image point of $I_0$ is attributed a depth z or equivalently a disparity d (defined as z=1/d) and can be expressed as $$P_0 = \begin{bmatrix} x'_0 \\ y'_0 \\ z \\ 1 \end{bmatrix} = \begin{bmatrix} x'_0 \\ y'_0 \\ 1 \\ d \end{bmatrix}$$

in the reference coordinate system $C_0$. While these two formulations are equivalent, using the disparity allows expression naturally points that reach an infinite depth. Thus, disparity is used instead of depth.

From this point $P_0$ it is possible to project back to any camera image $p'_i$ using the previously defined equations as $$p'_i = H(p_i)$$
$$= H(J P_i)$$
$$= H(J W_i P_w)$$
$$= H(J W_i W_0^{-1} P_0)$$

$$\begin{bmatrix} x'_i \\ y'_i \end{bmatrix} = H\left(J W_i W_0^{-1} \begin{bmatrix} x'_0 \\ y'_0 \\ 1 \\ d \end{bmatrix}\right)$$

and therefore obtain pixel intensity information from all cameras in order to perform the matching.

During the stereo matching, each reference image point $(x'_0, y'_0)$ and disparity value d has a set of associated reprojected pixel values that form a pixel value vector v. The value vector v is defined as $$v(x'_0, y'_0, d) = \left\{ I_i\left( H\left( J W_i W_0^{-1} \begin{bmatrix} x'_0 \\ y'_0 \\ 1 \\ d \end{bmatrix}\right)\right)\right\}, \forall i \in [1, \ldots, n] \quad (3)$$

and will be used to derive the matching cost.

It is a well known fact that for a given camera geometry, each image point is restricted to move along a single line called the epipolar line. In the traditional approach to stereo matching, a single epipolar line A in one stereo image is matched with a corresponding epipolar line B in the other stereo image. The established matching between the two lines is a path in the grid of all possible matches (a,b), as shown on the left of FIG. 1. The allowed starting and ending positions of the path are shown as thick black lines. By assuming that point ordering is maintained along epipolar lines, it is possible to solve this path problem very efficiently via dynamic programming.

Figure 1:
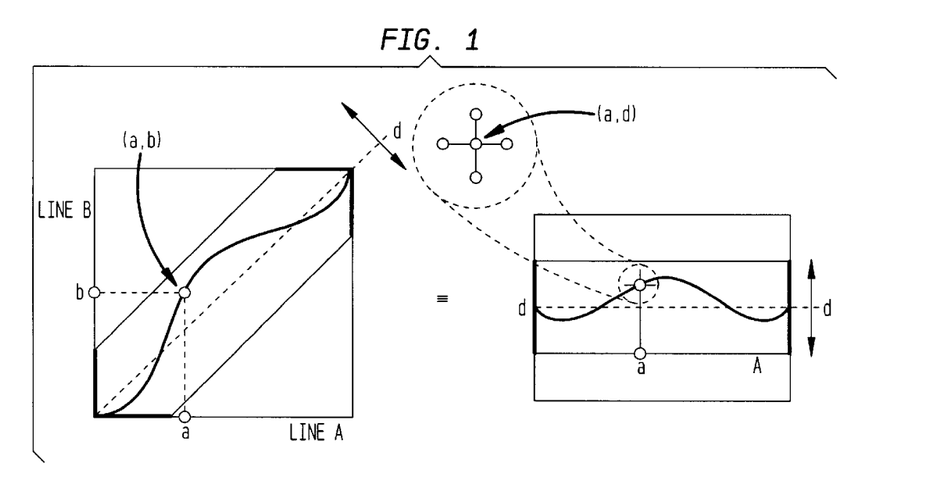
FIG. 1 is a diagram showing Epipolar matching.

With reference now to FIG. 1 and in particular to the right side of that Figure, the matching grid is transformed into an equivalent formulation. In this case, each potential match has the form (ad) where a is the position along the epipolar line and d the associated disparity. The coordinates in image B corresponding to the match (a,d) are easy to compute from Eq. 1, while the cost function is directly obtained from Eq. 2.

Figure 2:
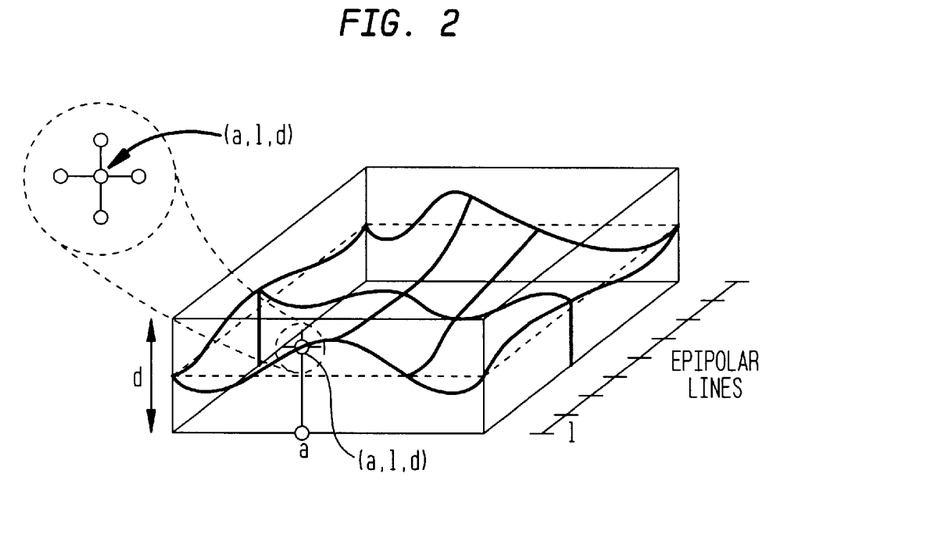
FIG. 2 is a diagram depicting matching of whole images.

An extension to matching a single pair of epipolar lines at a time would be to extend it to whole image at once, as depicted in FIG. 2, by matching all pairs of epipolar lines simultaneously. Every minimum-cost path defining the matching of one epipolar line is now assembled into a single minimum-cost surface. This surface contains all the disparity information of the reference image. The goal of this construction is to take advantage of one very important property of disparity fields, local coherence, suggesting that disparities tend to be locally very similar. This property was exploited indirectly by using the ordering constraint along epipolar lines. However, local coherence occurs in all directions and thus across epipolar lines. By putting all the epipolar lines together and solving globally for a disparity surface, it becomes possible to take fall advantage of local coherence and improve the resulting depth map.

Now that each potential match (a,l,d) in FIG. 2 is still four-connected as in FIG. 1. To take full advantage of local coherence, they should be six-connected to relate each individual epipolar line. Unfortunately, doing this makes dynamic programmimg unusable since there is no strict order for building the solution surface.

Figure 3:
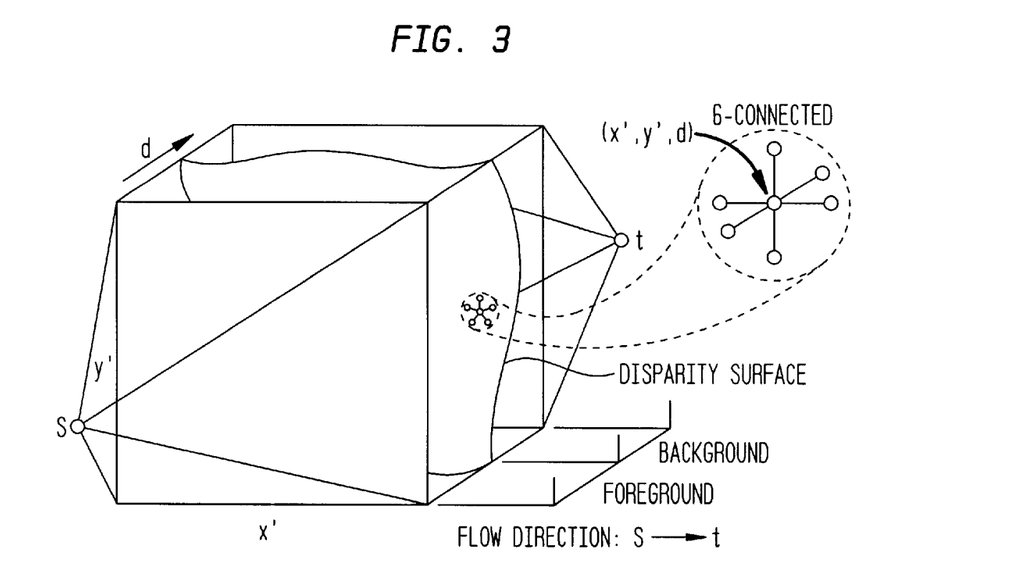
FIG. 3 is a diagram depicting image matching as a maximum flow problem according to the teachings of the present invention.

Advantageously, the present method solves globally for the disparity surface by adding a source and a sink to the formulation of FIG. 2, and treating the solution as a flow problem as depicted in FIG. 3. Consider the graph G=(V,E) forming a 3D mesh as depicted in FIG. 3. The vertex set V is defined as $$V = V^* \cup \{s, t\}$$

where s is the source, t is the sink, and V* is the 3D mesh $$V^* = \{(x',y',d) : x' \in [0 \ldots x'_{max}], y' \in y'_{max}], \in [0 \ldots d_{max}]\}$$

where ($x'_{max}+1$, $y'_{max}+1$) is the image size and $d_{max}+1$ is the depth resolution. Internally the mesh is six-connected and the source s connects to the front plane while the back plane is connected to the sink t. The result for edges E is $$E = \begin{cases} (u, v) \in V^* x V^* & : \|u - v\| = 1 \\ (s, (x', y', 0)) & : x' \in [0 \ldots x'_{max}], y' \in [0 \ldots y'_{max}] \\ ((x', y', d_{max}), t) & : x' \in [0 \ldots x'_{max}], y' \in [0 \ldots y'_{max}] \end{cases}$$

Being six-connected instead of four-connected, each vertex of the new problem is not only connected to its neighbors along the epipolar line, but also across adjacent epipolar lines (see FIG. 3). Since dynamic programming is useless in this situation, it is possible instead to compute the maximum-flow between the source and sink. The minimum-cut associated with the maximum flow will give the disparity surface directly.

In this context, the edge capacity represents the matching cost, except for edges adjacent to the source or sink, which have infinite capacities. The result is $$c(u, v) = \begin{cases} 0 & \text{if } (u, v) \notin E \\ \infty & \text{if } u = s \text{ or } v = t \\ reg(u, v) & \text{if } (u - v) = (0, 0, \Delta_d) \\ occ(u, v) & \text{if } (u - v) = (\Delta_x, \Delta_y, 0) \end{cases}$$

where reg(u,v) is a cost characterized by the absence of occlusion (i.e. regular) while occ(u,v) is an occlusion cost. In FIG. 3, the edges linking (x', y', d) to four black vertices are occlusion costs while links to gray vertices are regular costs. Define reg(u,v) from Equation 2 as $$reg(u, v) = \frac{cost(u) + cost(v)}{2}$$

Higher occlusion costs increase the surface smoothness of the surface, and, inversely, lower occlusion costs facilitate depth discontinuities. In practice, set occ(u,v) to a natural value occ(u,v)=reg(u,v)

or to a small constant larger than 0. Extreme values of the occlusion cost have intuitive consequences. When the occlusion cost is set to ∞, the resulting disparity surface is flat and features a single disparity value for the whole image. Setting the occlusion cost to 0, each pixel of the image is independently given a disparity, therefore achieving maximal discontinuity in the disparity surface.

It is well known that once the maximum flow is found, there is a cut C that separates the source and sink in such a way that the sum of capacities of C is minimized. The cut is therefore the optimal way to separate the source and the sink for the particular cost function. Since the source is connected to the closest points while the sink is connected to the deepest points, the cut effectively separates the view volume into a foreground and background and yields the depth map of the scene. The application of the maximum-flow, minimum-cut to solve the stereo correspondence problem has never been considered in the prior art. The minimum cut is also guaranteed to provide a depth estimate for each image point, as demonstrated by Property 1.

Property 1 (cut as a depth map)

Consider a cut C associated with some flow in the graph G=(V,E). For all (xy), there exists at least one d such that the edge (x,y,d)–(x,y,d+1) is part of C. Proof. For any (x,y), there is a path s~t in G such that s→(x,y,0)→(x,y,1)~(x,y,$d_{max}$)→t therefore containing the set of edges $$\begin{cases} s \to (x, y, 0) \\ (x, y, d) \to (x, y, d+1) \quad d \in [0, d_{max} - 1] \\ (x, y, d_{max}) \to t \end{cases}$$

Any cut of G must break this path and thus contain at least one edge of the form (xy,d)–(x,y,d+1) since the edges s→(x,y,0) and (x,y,$d_{max}$)→t have infinite capacities.

According to property 1, a depth map can be constructed from the minimum-cut C of graph G as follows. For each point (x,y), the disparity is the largest d such that the edge (x,y,d)–(x,y,d+1) belongs to C. This results in the desired global disparity surface.

An important distinction has to be made between the stereo matching problems depicted in FIGS. 2 and 3. In the case of FIG. 2, the epipolar lines are simply stacked up one after the other. While this might work for two-images stereo, it does not extend well to the case of multiple-images stereo image since the epipolar lines are specific to a single pair of cameras and arbitrary camera geometries will yield arbitrary set of epipolar lines.

To alleviate this problem, the ordering constraint is removed altogether. As mentioned earlier, the local coherence property approximates that constraint quite well. In the new formulation, it is possible to select any set of lines in the image to be stacked together. The obvious choice is to take the set of horizontal lines since this is the natural image ordering. This is why it is possible to refer to a point in FIG. 3 by its image coordinates (x',y') instead of the epipolar line index l and a position a in FIG. 2.

The epipolar geometry is now only indirectly used in computing the matching cost for points with given disparity values but does not contribute any actual constraint to the matching process.

A standard preflow-push algorithm, as described by T. H. Cormen, C. E. Leiserson, and R. L. Rivest, "Introduction to Algorithms", McGraw-Hill, N.Y., 1990, was used to solve the maximum-flow problem. The number of nodes in the graph is equal to the number of image pixels multiplied by the depth resolution. For an image of size n pixels, i.e. of dimension approximately $\sqrt{n} \times \sqrt{n}$, and a depth resolution of d steps, V=nd. Since the graph to solve is a three-dimensional mesh where each node is six-connected, the number of edges is E≈6 V. This means that in practice, algorithms solving maximum flow in $O(VE^2)$, $O(V^2E)$, or $O(V^3)$ are all equivalent on this problem. Currently, only the preflow-push lift-to-front algorithm (which is $O(V3)$) was tested, but other preflow-push algorithms should perform satisfactorily.

Figure 4:
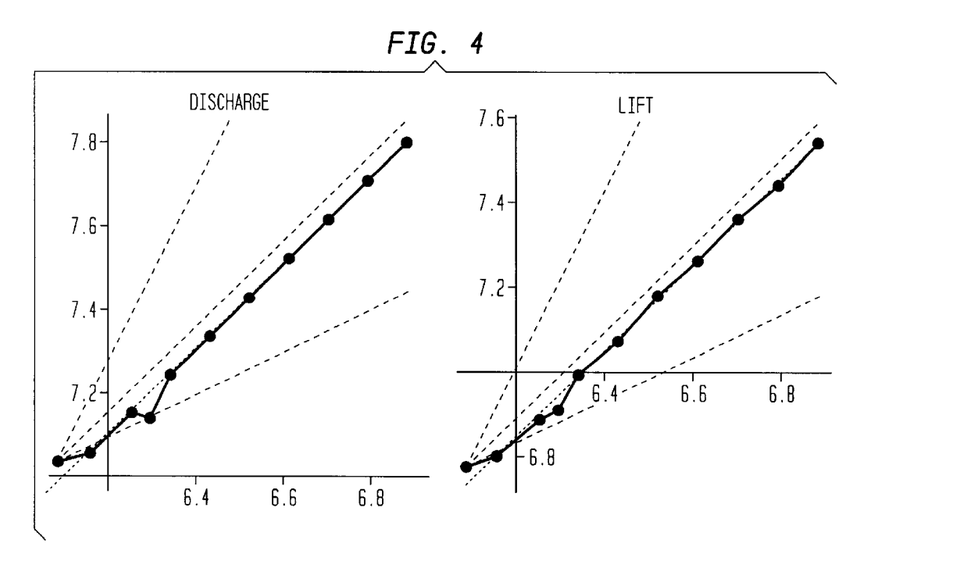
FIG. 4 is a graph showing the performance of the method of the present method as a function of image size in pixels.
Figure 5:
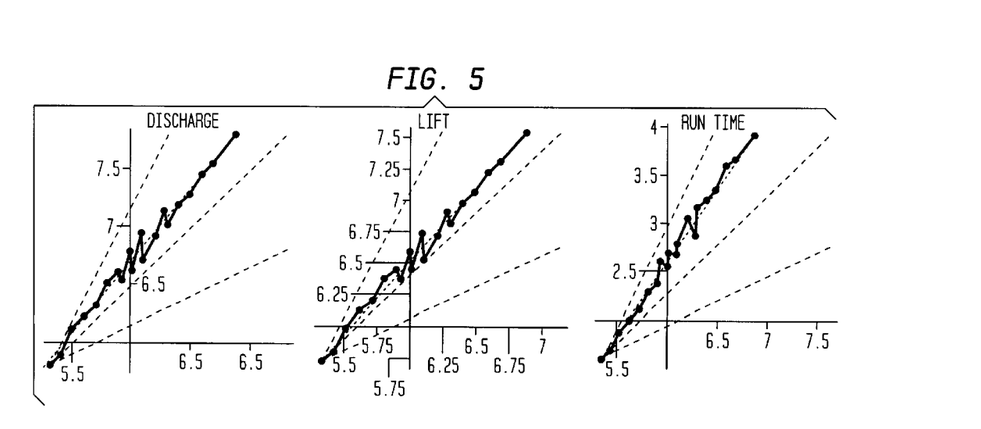
FIG. 5 is a graph showing the performance of the method of the present invention as a function of depth for fixed image size.

In the term of image dimensions, $O(V^3)$ translates into $O(n^3d^3)$. The standard dynamic programming approach on separate epipolar lines requires a total running time of θ(nd). This might seem much better than $O(n^3d^3)$. However, the topology of the graph, the position of source and sink, and the nature of edge capacities all tend to make the problem easier to solve. FIGS. 4 and 5 show the typical performance of the present invention as a function of image size n (in pixels) and depth resolution d. The average running time is $0(n\ d^{1.4})$, which is linear with respect to image size n (in pixels) and compares favorably with the dynamic programming approach.

Figure 6:
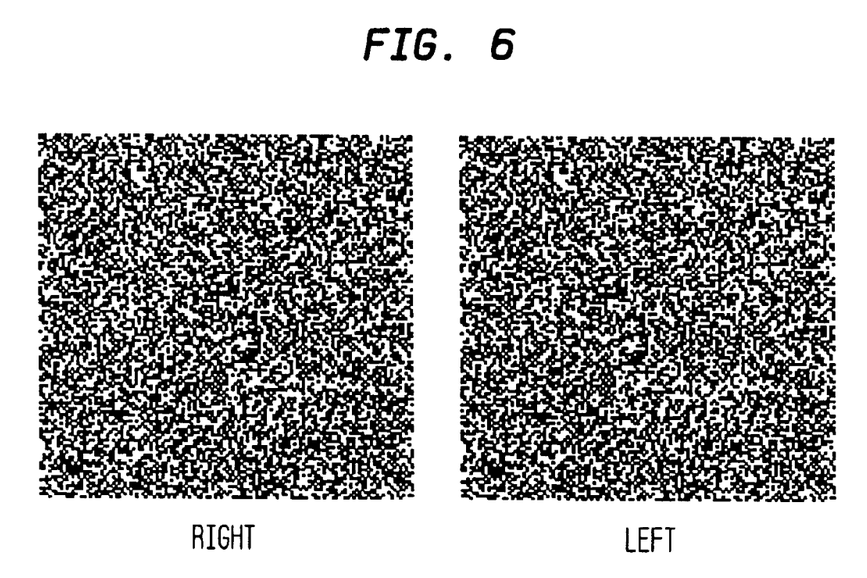
FIG. 6 is a random dot stereogram.
Figure 7A:
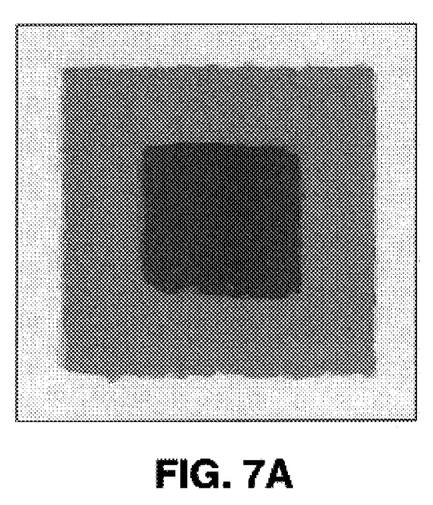
FIGS. 7A and 7B are disparity maps for the random dot stereogram of FIG. 6.
Figure 7B:
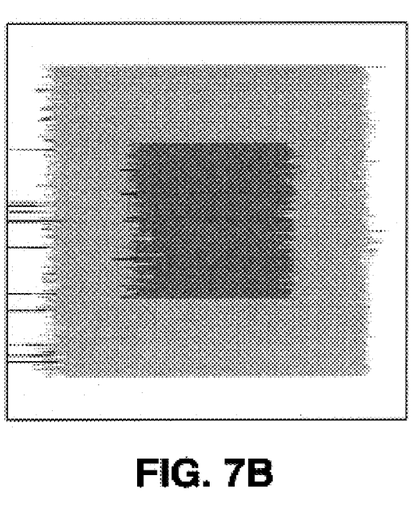

To demonstrate the symmetry in the disparity map achieved by the maximumflow method, it was applied to a random-dot stereogram as shown in FIG. 6 with disparities set at 0, 4 and 8 pixels. The resulting disparity maps, shown in FIG. 7A and 7B for maximum-flow and standard stereo mapping methods respectively, differ primarily around depth discontinuities. The maximum-flow method features similar boundaries in all directions while the standard stereo yields a very different boundary shape, due to the fact that solutions are computed horizontally and no information is shared vertically.

Figure 8A:
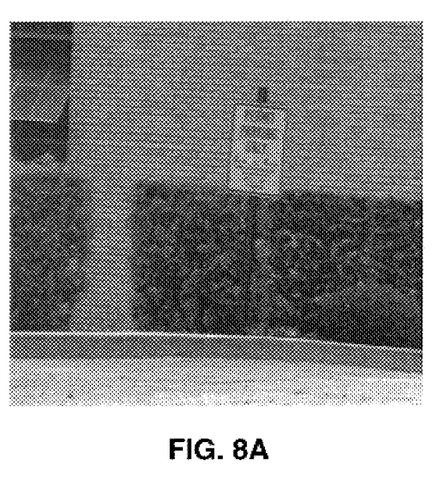
FIG. 8 is a stereo pair for a representative image.
Figure 8B:
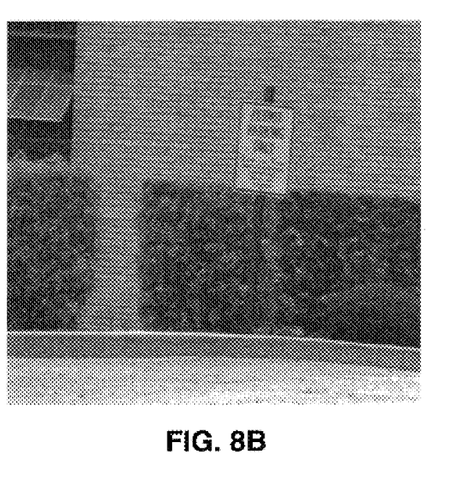
Figure 9A:
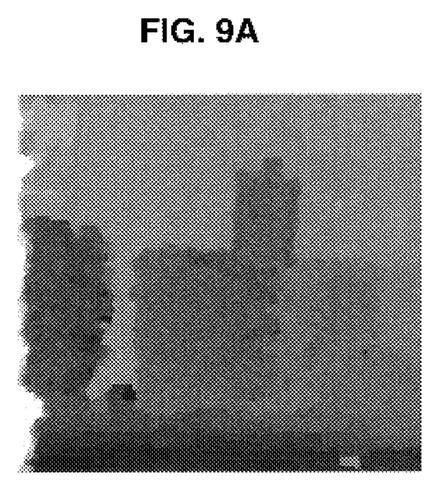
FIG. 9 is a set of disparity maps for the image of FIG. 8.
Figure 9B:
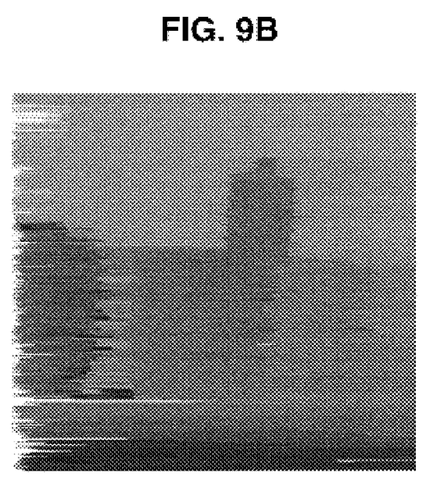
Figure 9C:
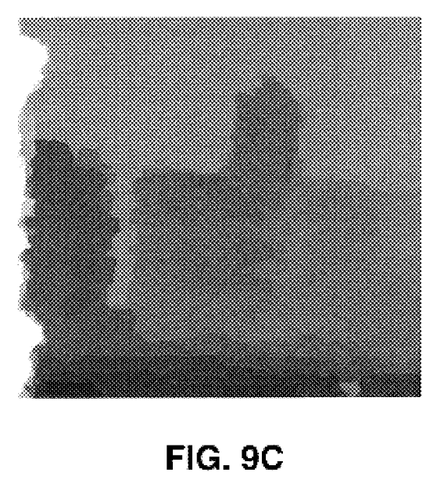
Figure 9D:
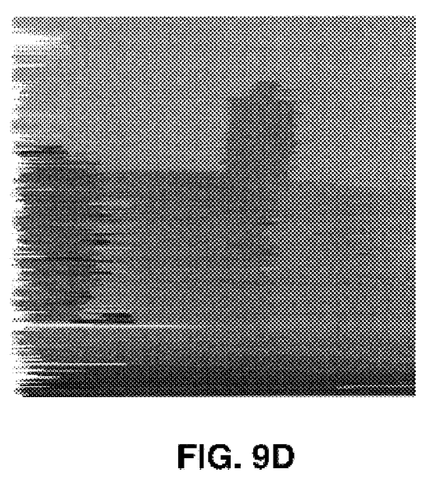

In the case of simple camera geometry and a pair of shrub images shown in FIG. 8, it is possible to differentiate between a non-occluded match and an occluded match. The brand image is the non-occluded match. It is possible to then treat occlusions differently by changing the edge capacities specific to different match. FIGS. 9A–9D are a set of disparity maps for the images in FIG. 8. The maximum flow maps are shown in FIG. 9A and FIG. 9C. Standard stereo maps are shown in FIG. 9B and FIG. 9D. FIG. 9A and FIG. 9B are 32 disparity step resolution and FIG. 9C and FIG. 9D are 128 disparity step resolution.

It should be noted that the maximum-flow maps (FIGS. 9A and 9C) tend to extract sharp and precise depth discontinuities while the standard stereo maps (FIGS. 9B and 9D) produce many artifacts along vertical depth discontinuities. The level of depth resolutions show different levels of smoothness. Even at high smoothness levels, maximum flow does not produce spurious horizontal lines across the gap between the two larger shrubs.

Figure 10A:
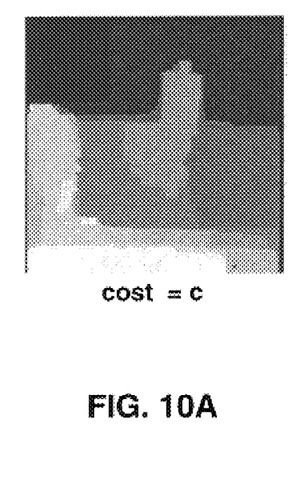
FIGS. 10A, 10B and 10C are a set of disparity maps for the image of FIG. 8 at three occlusion costs.
Figure 10B:
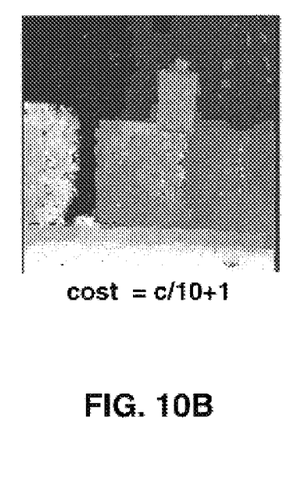
Figure 10C:
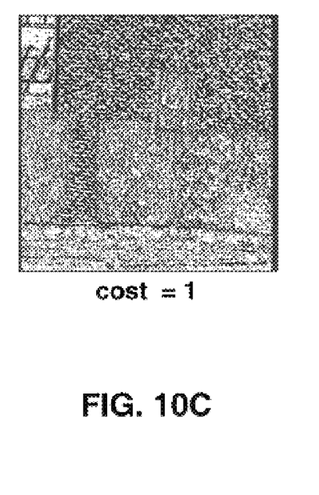

In the simplest case, the occlusion cost is the regular non-occluded cost. It is set to a very high value in order to discourage occlusion and favor surface smoothness. In the opposite extreme, this cost is set to the smallest possible value allowing a non trivial solution, i.e. the constant 1. FIG. 10A, FIG. 10B and FIG. 10C illustrate how changing the occlusion cost can affect the disparity maps obtained. As expected, lowering the capacities favors depth discontinuities and therefore creates sharper object edges, at the expense of smoothness of surfaces. It is observed, however, that depth discontinuities tend to be sharper than other methods, for a given level of smoothness. This result differs strongly from most other methods where high level of smoothness correspond to blurred or missing depth discontinuities.

While the above description generally refers to plural cameras and a single scene, in fact, the invention applies to an arbitrary sequence of images a common scene. The invention also applies to a sequence taken by one or more cameras at a single instance or over a period time. For example, two or more synchronized still cameras obtaining an image at the same instance, or a single camera taking images over a time period, e.g. one or more still cameras obtaining images while the camera(s) is/are in motion or a video camera which is in motion.

In conclusion, I describe how to use a vector of pixel values to derive a meaningful matching cost. If it is assumed that surfaces are lambertian (i.e. with a surface reflectance independent of light direction), then the intensity values of v(x', y', d) should be the same if (x', y', d) is on the surface of an object. The matching cost c(c', y', d) is then defined as the variance of vector v=v(x', y', d) of n elements, that is $$c(x', y', d) = \frac{1}{n}\sum (v - \overline{v})^2$$

Figure 13:
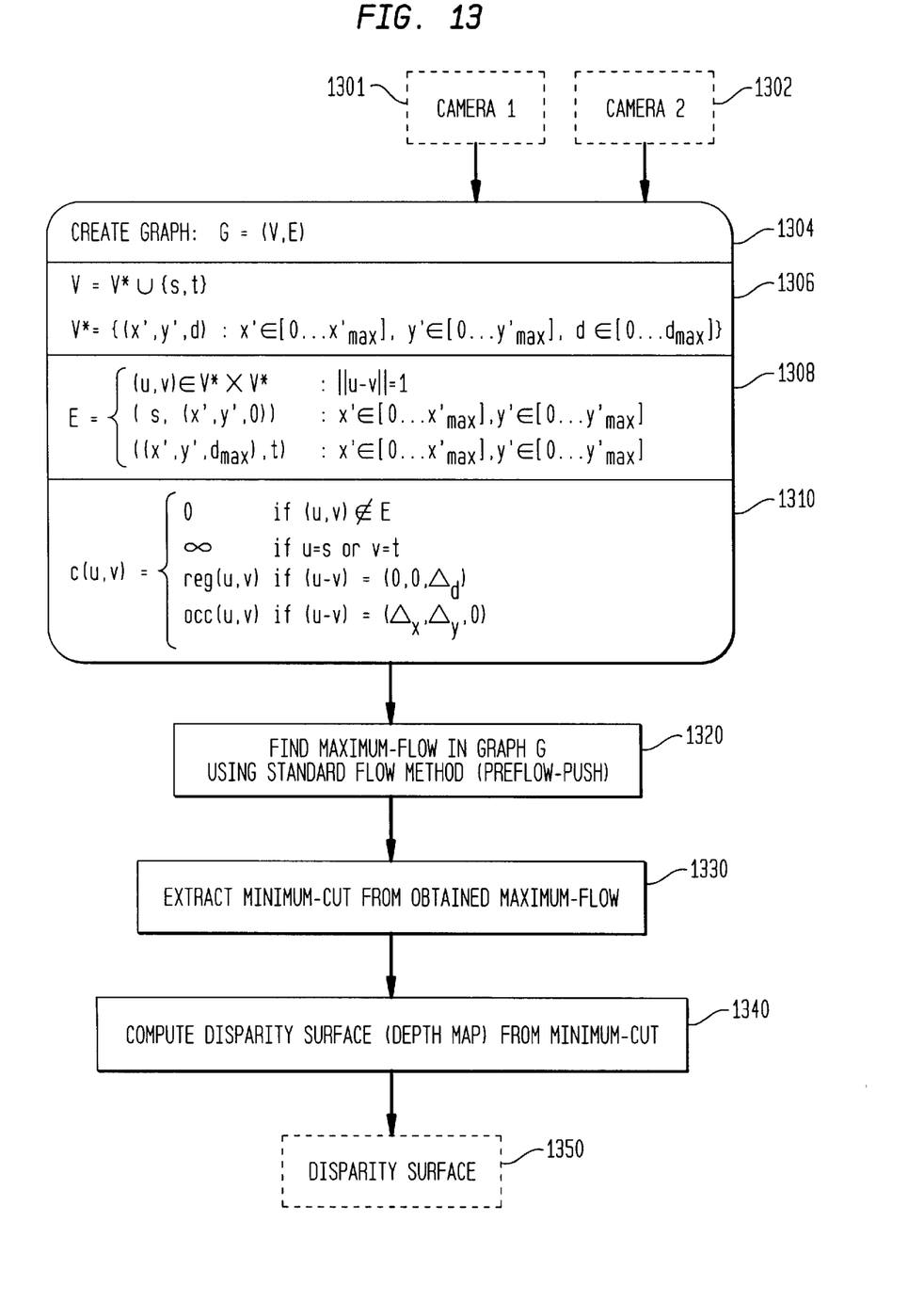
FIG. 13 is a flow diagram which depicts the overall method of the present invention.

With reference now to FIG. 13, there it shown a flow chart which depicts the overall method of the present invention. Specifically, and with reference to that Figure, two cameras 1301 and 1302 provide an input image(s) to the method. A graph (G) is created 1304 composed of a set of vertices (V) 1306, and a set of edges (E) 1308 linking these vertices, and a capacity function (c(u,v)) 1310.

Then a maximum-flow is determined in the graph (G) using standard flow method (preflow-push) 1320. The minimum-cut is extracted from the determined maximum-flow 1330. The disparity surface (depth map) is computed from the extracted minimum-cut 1340. The final disparity surface 1350 is derived from the computed disparity surface in 1340. The result is a disparity surface which is the stereo correspondence sought.

While there has been described and illustrated a method for performing stereoscopic correspondence between two or more arbitrary views of a scene, it will be understood by those skilled in the art that variations and modifications are possible without deviating from the spirit and broad teachings of the present invention which shall be limited solely by the scope of the claims appended hereto.

What is claimed is:

1. A method of obtaining stereo correspondence between multiple views of a scene comprising the steps of:
    obtaining a sequence of images of a scene;
    creating a graph G=(V, E) of the entire scene comprising
        a set of vertices V, a set of edges E linking the vertices,
        a source s, a sink t, and an edge capacity function c(u,v)
        representing matching cost, where u and v are vertices
        other than a source or a sink;
    finding a maximum-flow in graph G;
    extracting a minimum-cut from said maximum-flow; and
    computing a disparity surface from said minimum-cut.

2. A method as set forth in claim 1, where said sequence of images is obtained by a plurality of cameras.

3. A method as set forth in claim 1, where said sequence of images is obtained by two or more cameras at a single instance of time.

4. A method as set forth in claim 1, where said sequence of images is obtained by a one or more cameras over a period of time.

5. A method as set forth in claim 1, where said sequence of images is obtained by a one or more cameras in motion.

6. A method as set forth in claim 1, where said sequence of images is obtained by one or more video cameras in motion.

7. A method as set forth in claim 1, where said creating a graph G includes a source s connected to the front plane of the graph and a sink t connected to the back plane of the graph.

8. A method as set forth in claim 1, where said set of vertices V is $V = V^* \cup \{s,t\}$, and $V^* = \{(x',y',d): x' \epsilon [0 \ldots x'_{max}], y' \epsilon y[0 \ldots y'_{max}], d \epsilon [0 \ldots d_{max}]\}$ where $V^*$ is a 3D mesh, said set of edges E is $$E = \begin{cases} (u, v) \in V^* x V^* & : \|u - v\| = 1 \\ (s, (x', y', 0)) & : x' \in [0 \ldots x'_{max}], y' \in [0 \ldots y'_{max}] \\ ((x', y', d_{max}), t) & : x' \in [0 \ldots x'_{max}], y' \in [0 \ldots y'_{max}] \end{cases}$$

and said capacity function $c(u, v)$ is:

$$c(u, v) = \begin{cases} 0 & \text{if } (u, v) \notin E \\ \infty & \text{if } u = s \text{ or } v = t \\ reg(u, v) & \text{if } (u - v) = (0, 0, \Delta_d) \\ occ(u, v) & \text{if } (u - v) = (\Delta_x, \Delta_y, 0) \end{cases}$$

where $reg(u,v)$ is a cost characterized by the absence of occlusion and $occ(u,v)$ is an occlusion cost.

\* \* \* \* \*